(12) United States Patent
Bartholomä et al.

(10) Patent No.: US 10,746,053 B2
(45) Date of Patent: Aug. 18, 2020

(54) TURBOCHARGER

(71) Applicant: MAN ENERGY SOLUTIONS SE, Augsburg (DE)

(72) Inventors: Klaus Bartholomä, Friedberg (DE); Santiago Uhlenbrock, Gräfenberg (DE); Jan-Christoph Haag, Hirschberg (DE); Jiří Klíma, Namest nad Oslavou (CZ); Tobias Weisbrod, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 84 days.

(21) Appl. No.: 16/122,002

(22) Filed: Sep. 5, 2018

(65) Prior Publication Data

US 2019/0072002 A1  Mar. 7, 2019

(30) Foreign Application Priority Data

Sep. 5, 2017  (DE) .......................... 10 2017 215 539

(51) Int. Cl.
| | |
|---|---|
| *F01D 25/16* | (2006.01) |
| *F01D 25/24* | (2006.01) |
| *F01D 11/00* | (2006.01) |
| *F02C 6/12* | (2006.01) |

(52) U.S. Cl.
CPC .......... *F01D 25/243* (2013.01); *F01D 11/003* (2013.01); *F01D 25/16* (2013.01); *F02C 6/12* (2013.01); *F05D 2220/40* (2013.01); *F05D 2230/41* (2013.01); *F05D 2230/90* (2013.01)

(58) Field of Classification Search
None
See application file for complete search history.

(56) References Cited

U.S. PATENT DOCUMENTS

| | | | |
|---|---|---|---|
| 2013/0051988 A1* | 2/2013 | Heidingsfelder | F01D 17/165 |
| | | | 415/148 |
| 2018/0087531 A1* | 3/2018 | Weisbrod | F01D 25/243 |
| 2018/0320554 A1* | 11/2018 | Hossbach | F01D 25/243 |
| 2018/0328373 A1* | 11/2018 | Aynacioglu | F04D 29/023 |
| 2019/0072001 A1* | 3/2019 | Weisbrod | F01D 25/243 |
| 2019/0078468 A1* | 3/2019 | Haas | F01D 11/025 |
| 2019/0093515 A1* | 3/2019 | Braun | F02B 37/00 |
| 2019/0120132 A1* | 4/2019 | Bogner | F01D 25/246 |
| 2019/0136804 A1* | 5/2019 | Watanabe | F01D 25/265 |
| 2019/0301358 A1* | 10/2019 | Bozek | F02B 37/00 |

FOREIGN PATENT DOCUMENTS

| | | |
|---|---|---|
| DE | 10 2009 056 875 | 6/2011 |
| DE | 10 2013 002 605 | 8/2014 |
| EP | 1 988 261 | 11/2008 |

* cited by examiner

*Primary Examiner* — Michael Lebentritt
(74) *Attorney, Agent, or Firm* — Cozen O'Connor

(57) ABSTRACT

A turbocharger, with a turbine and compressor housing connected to a bearing housing. An inflow housing of the turbine and bearing housing are connected via a fastening device mounted to a flange of the inflow housing with a first section and partially overlaps a flange of the bearing housing with a second section. Between the inflow housing and the bearing housing, flanges of a nozzle ring and of a sealing cover are clamped. Adjoining surfaces contacting one another in a region of a first, second, and/or a third contact clamping region are hardened.

9 Claims, 2 Drawing Sheets

TURBOCHARGER

BACKGROUND OF THE INVENTION

1. Field of the Invention

The invention relates to a turbocharger.

2. Description of the Related Art

From DE 10 2013 002 605 A1 the fundamental construction of a turbocharger is known. A turbocharger comprises a turbine in which a first medium is expanded. A turbocharger further comprises a compressor in which a second medium is compressed utilizing energy extracted in the turbine during the expansion of the first medium. The turbine of the turbocharger comprises a turbine housing and a turbine rotor. The compressor of the turbocharger comprises a compressor housing and a compressor rotor. Between the turbine housing of the turbine and the compressor housing of the compressor a bearing housing is positioned, wherein the bearing housing on the one hand is connected to the turbine housing and on the other hand to the compressor housing. In the bearing housing, a shaft is mounted via which the turbine rotor is coupled to the compressor rotor.

From practice it is known that the turbine housing of the turbine, namely a so-called inflow housing, as well as the bearing housing, are connected to one another via a fastening device that is preferentially designed as clamping claw. Such a fastening device designed as a clamping claw is mounted with a first section of the same to a flange of the turbine housing via fasteners and covers with a second section a flange of the bearing housing at least in sections. By way of such a fastening device, the combination of bearing housing and turbine housing is clamped, namely clamping a sealing cover and nozzle ring between turbine housing and bearing housing.

The turbine housing is filled with the first medium to be expanded, in particular with exhaust gas to be expanded. The inflow housing of the turbine housing conducts the exhaust gas in the direction of the turbine rotor. In the inflow housing there is an overpressure relative to the surroundings, which is depressurized in the turbine subject to extracting energy during the expansion of the first medium. In the region of the connection of turbine housing or inflow housing and bearing housing a leakage can occur so that the first medium to be expanded in the turbine can enter the surroundings via the connecting region between turbine housing and bearing housing. This is disadvantageous.

In order to counteract such a leakage of the first medium to be expanded in the turbine, the clamping between turbine housing or inflow housing and bearing housing is increased, in particular via higher tightening torques for the fasteners, via which the fastening device preferentially designed as clamping claw is mounted to the turbine housing. This increases a clamping force between the fastening device and the bearing housing. Furthermore, a clamping force between bearing housing and sealing cover, between sealing cover and nozzle ring and between nozzle ring and inflow housing is increased. The above contact clamping regions between fastening device and bearing housing, between bearing housing and sealing cover, between sealing cover and nozzle ring and between nozzle ring and inflow housing are exposed to relative movements as a consequence of the different thermal expansions of the assemblies, in particular of bearing housing and inflow housing. The relative movements can also be caused by vibrations or gas forces. In conjunction with a high contact pressure or a high preload or a high clamping force, where in the region of the contact clamping regions can then occur as a consequence of a so-called digging effect. This can cause a leakage of the first medium to be expanded in the turbine into the surroundings, while, furthermore, the connection of inflow housing and bearing housing can be loosened in an extreme case.

SUMMARY OF THE INVENTION

One aspect of the present invention is creating a new type of turbocharger with a lower risk of wear. According to one aspect of the invention, adjoining surfaces contacting one another in the region of the first contact clamping region and/or in the region of the second contact clamping region and/or in the region of the third contact clamping region are hardened. Because of this, wear in the region of the contact clamping regions can be reduced.

Preferentially, the adjoining surfaces contacting one another in the region of at least two contact clamping regions, particularly preferably of all three contact clamping regions from the group of contact clamping regions comprising the first contact clamping region and the second contact clamping region and the third contact clamping region are hardened. Because of this, wear in the region of the contact clamping regions can be further reduced.

Between the second section of the fastening region and the flange of the bearing housing, a fourth contact clamping region is formed, whose adjoining surfaces contacting one another are preferentially likewise hardened. Because of this, wear in the region of the contact clamping region can be further reduced.

According to an advantageous further development of the invention, a surface of the flange of the turbine housing in the first contact clamping region and/or a surface of the flange of the bearing housing in the third contact clamping region are each hardened by coating. A surface of the flange of the nozzle ring in the first contact clamping region and/or second contact clamping region and/or a surface of the flange of the sealing cover in the second contact clamping region and/or third contact clamping region are hardened by nitriding. This hardening of the surfaces is preferred.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
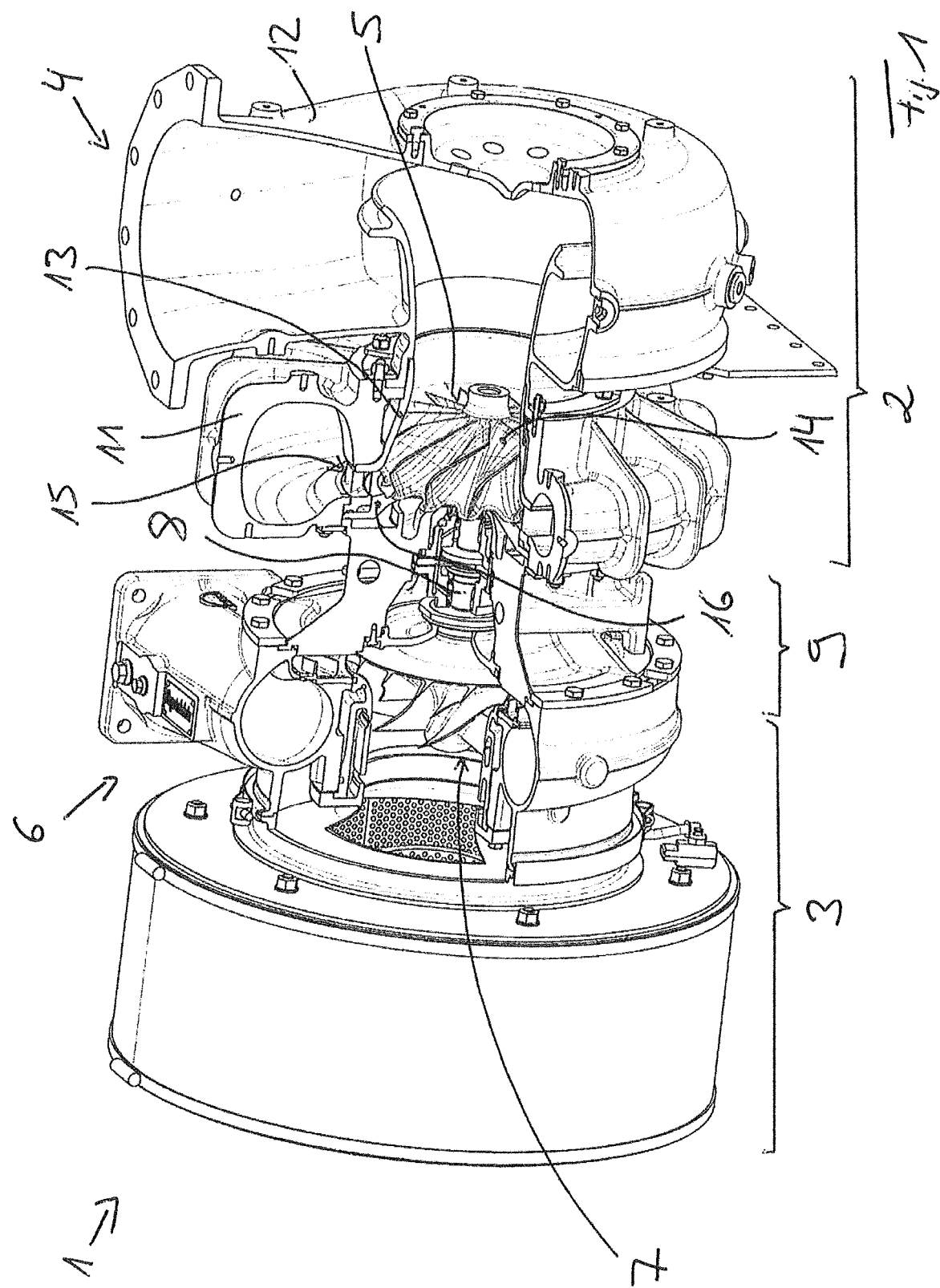
FIG. 1 is a cross section through a turbocharger.
Figure 2:
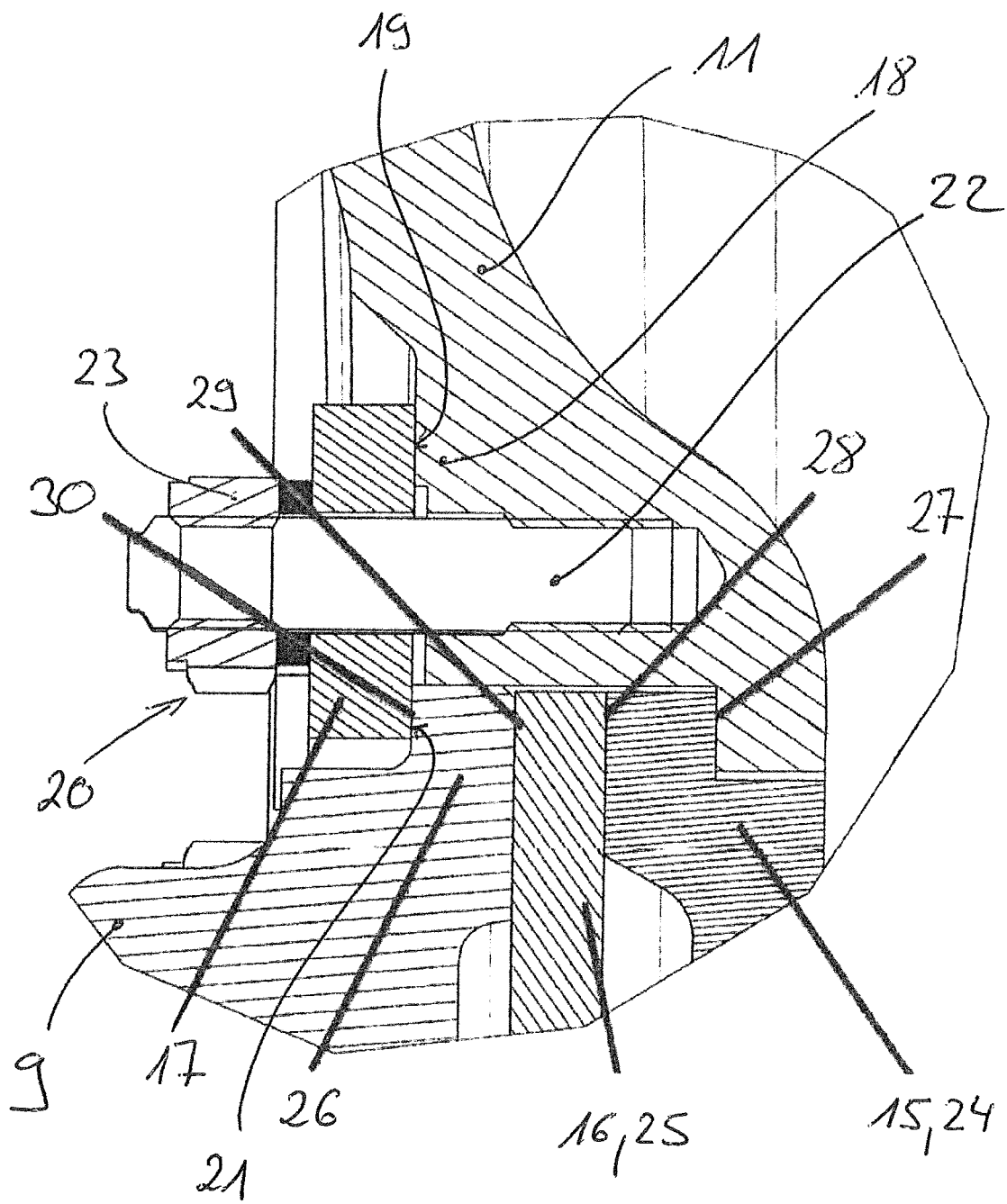
FIG. 2 is a cross section through a turbocharger in the region of an inflow housing and of a bearing housing of the turbocharger.

The invention relates to a turbocharger.

A turbocharger 1 comprises a turbine 2 for expanding a first medium, in particular for expanding exhaust gas of an internal combustion engine. Furthermore, the turbocharger 1 comprises a compressor 3 for compressing a second medium, in particular charge air, utilizing energy extracted in the turbine 2 during the expansion of the first medium.

Here, the turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8, which is mounted in a bearing housing 9. The bearing housing 9 is positioned between the turbine housing 4 and the compressor housing 5 and is connected both to the turbine housing 4 and the compressor housing 5.

The turbine housing 4 of the turbine 2 comprises an inflow housing 11 and an outflow housing 12. By way of the inflow housing 11, the first medium to be expanded in the region of the turbine 2 can be fed to the turbine rotor 5. By way of the outflow housing 12, first medium expanded in the region of the turbine rotor 5 flows away from the turbine 2.

In addition to the inflow housing 11 and the outflow housing 12, the turbine housing 4 comprises an insert piece 13. The insert piece 13 runs, in particular, in the region of the inflow housing 11, namely adjacently to the turbine rotor 5 adjoining moving blades 14 of the turbine rotor 5 radially outside.

The turbine housing 4, furthermore, comprises a nozzle ring 15. The nozzle ring 15 is also referred to as turbine guide apparatus.

Furthermore, FIG. 1 shows a sealing cover 16 in the connecting region of inflow housing 11 and bearing housing 9. The sealing cover 16 is also referred to as a bearing housing cover or heat shield.

The inflow housing 11 of the turbine 2 is connected to the bearing housing 2 via a fastening device 17 in such a manner that the fastening device 17 is mounted to a flange 18 of the inflow housing 11 with a first section 19, namely by way of multiple fasteners 20, and that the fastening device 17 overlaps a flange 26 of the bearing housing 9 with a second section 21 at least in sections. The fastening device 17 is also referred to as clamping claw. Seen in the circumferential direction, the fastening device 17 can be segmented.

Each fastener 20 comprises a threaded bolt 22 screwed into the flange 18 of the inflow housing 11 and a nut 23 acting on the other end of the threaded bolt 22, wherein by tightening the nut 23 a defined preloading force can be exerted via the fastening device 17 on the inflow housing 11 and on the bearing housing 9. By way of this, corresponding flanges 24, 25 of nozzle ring 15 and sealing cover 16 are clamped between inflow housing 11 and bearing housing 9.

In the above manner, multiple contact clamping regions are formed in the connecting region between the inflow housing 11 of the turbine 2 and the bearing housing 9, namely between the flange 18 of the inflow housing 11 and the flange 24 of the nozzle ring 15. A first contact clamping region 27 is formed between the flange 24 of the nozzle ring 15 and the flange 25 of the sealing cover 16, a second contact clamping region 28, a third contact clamping region between the flange 25 of the sealing cover 16 and the flange 26 of the bearing housing 9 and a fourth contact clamping region 30 between the flange 26 of the bearing housing 9 and the second section 21 of the fastening device 17.

In terms of one aspect of the present invention, adjoining surfaces contacting one another in the region of the first contact clamping region 27, and/or in the region of the second contact clamping region 28, and/or in the third contact clamping region 29 are hardened.

Preferentially, the adjoining surfaces contacting one another in the region of at least two contact clamping regions, particularly preferably in the region of all three contact clamping regions from the group of contact clamping regions comprising the first contact clamping region 27, the second contact clamping region 28, and the third contact clamping region 29 are hardened.

In an advantageous further development of the invention it can be provided that adjoining surfaces contacting one another in the region of the fourth contact clamping region 30 are also hardened.

The hardening of the adjoining surfaces is preferentially effected in such a manner that the surface hardness of the respective surfaces amounts to at least 40 HRC.

In a preferred exemplary embodiment of the invention it is provided that a surface of the flange 18 of the inflow housing 11 of the turbine 2 in the first contact clamping region 27 is hardened by coating, preferentially by way of a cobalt-chromium coating, which is applied onto the flange 18 of the inflow housing 11 by spraying-on. The surface of the flange 24 of the nozzle ring 15 in the first contact clamping region 27 and in the second contact clamping region 28 is hardened by nitriding in each case, preferentially by gas nitriding. The surface of the flange 25 of the sealing cover 16 in the region of the second contact clamping region 28 and the third contact clamping region 29 is preferentially likewise hardened by nitriding, in particular by way of salt bath nitriding. The surface of the flange 26 of the bearing housing 9 in the third contact clamping region 29 is hardened by a coating, preferentially by a cobalt-chromium coating, which is applied to the flange 26 of the bearing housing 9 in the third contact clamping region 29 by spraying-on. The surface of the flange 26 of the bearing housing 9 in the fourth contact clamping region 29 is preferentially embodied likewise by such a cobalt-chromium coating, wherein the surface of the second section 21 of the fastening device 17 in the fourth contact clamping region 30 is preferentially hardened by nitriding. Although this hardening of the surfaces in the contact clamping regions is preferred, the surfaces can also be hardened by other hardening methods.

With the invention, the wear of the above contact clamping regions 27, 28, 29, and 30 can be reduced. Because of this, the connection of inflow housing 11 of the turbine 2 and bearing housing 9 is altogether subject to less wear. The risk of unintentional loosening of this connection and the risk of an exhaust gas leakage into the surroundings can thus be reduced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbocharger, comprising:
   a shaft
   a turbine for expanding a first medium, having:
   a turbine housing; and
   a turbine rotor;
   a compressor for compressing a second medium utilising energy extracted in the turbine during expansion of the first medium, having:
   a compressor housing; and
   a compressor rotor that is coupled to the turbine rotor via the shaft;
   a bearing housing arranged between and connected to the turbine housing and the compressor housing, and in which the shaft is mounted;
   a fastening device configured to connect an inflow housing of the turbine housing and the bearing housing such that the fastening device is mounted to a flange of the inflow housing with a first section and overlaps a flange of the bearing housing with a second section at least in sections; and
   respective flanges of a nozzle ring and a sealing cover are clamped between the flange of the inflow housing and the flange of the bearing housing such that:
   a first contact clamping region is formed between the flange of the inflow housing and the flange of the nozzle ring;
   a second contact clamping region is formed between the flange of the nozzle ring and the flange of the sealing cover; and
   a third contact clamping region is formed between the flange of the sealing cover and the flange of the bearing housing;
   wherein, adjoining surfaces contacting one another in a region of the first contact clamping region, the second contact clamping region, and the region of the third contact clamping region are hardened,
   wherein a surface of the flange of the inflow housing in the first contact clamping region is hardened by coating;
   wherein a surface of the flange of the nozzle ring is hardened by nitriding;
   wherein a surface of the flange of the sealing cover is hardened by nitriding;
   wherein a surface of the flange of the bearing housing is hardened by a coating; and
   wherein a surface of the second section of the fastening device is hardened by nitriding.

2. The turbocharger according to claim 1, wherein the surface of the flange of the inflow housing in the first contact clamping region is hardened by a cobalt-chromium coating.

3. The turbocharger according to claim 1, wherein the surface of the flange of the nozzle ring in the first and/or the second contact clamping region is hardened by gas nitriding.

4. The turbocharger according to claim 1, wherein the surface of the flange of the sealing cover in the second and/or the second contact clamping region is hardened by salt bath nitriding.

5. The turbocharger according to claim 1, wherein the surface of the flange of the bearing housing in the third contact clamping region is hardened by a cobalt-chromium coating.

6. The turbocharger according to claim 1, wherein between the second section of the fastening device and the flange of the bearing housing a fourth contact clamping region is formed, whose adjoining surfaces contacting one another are hardened.

7. The turbocharger according to claim 6, wherein a surface of the flange of the bearing housing in the fourth contact clamping region is hardened by coating and a surface of the second section of the fastening device is hardened by nitriding.

8. The turbocharger according to claim 1, wherein a surface hardness in the region of the hardened surfaces is at least 40 HRC.

9. The turbocharger according to claim 7, wherein the fourth contact clamping region is hardened by coating with a cobalt-chromium coating.

* * * * *